May 12, 1964  E. A. KRUPOTICH  3,132,629
ENVELOPE OPENING AND DISTRIBUTING APPARATUS
Filed June 27, 1960  6 Sheets-Sheet 1
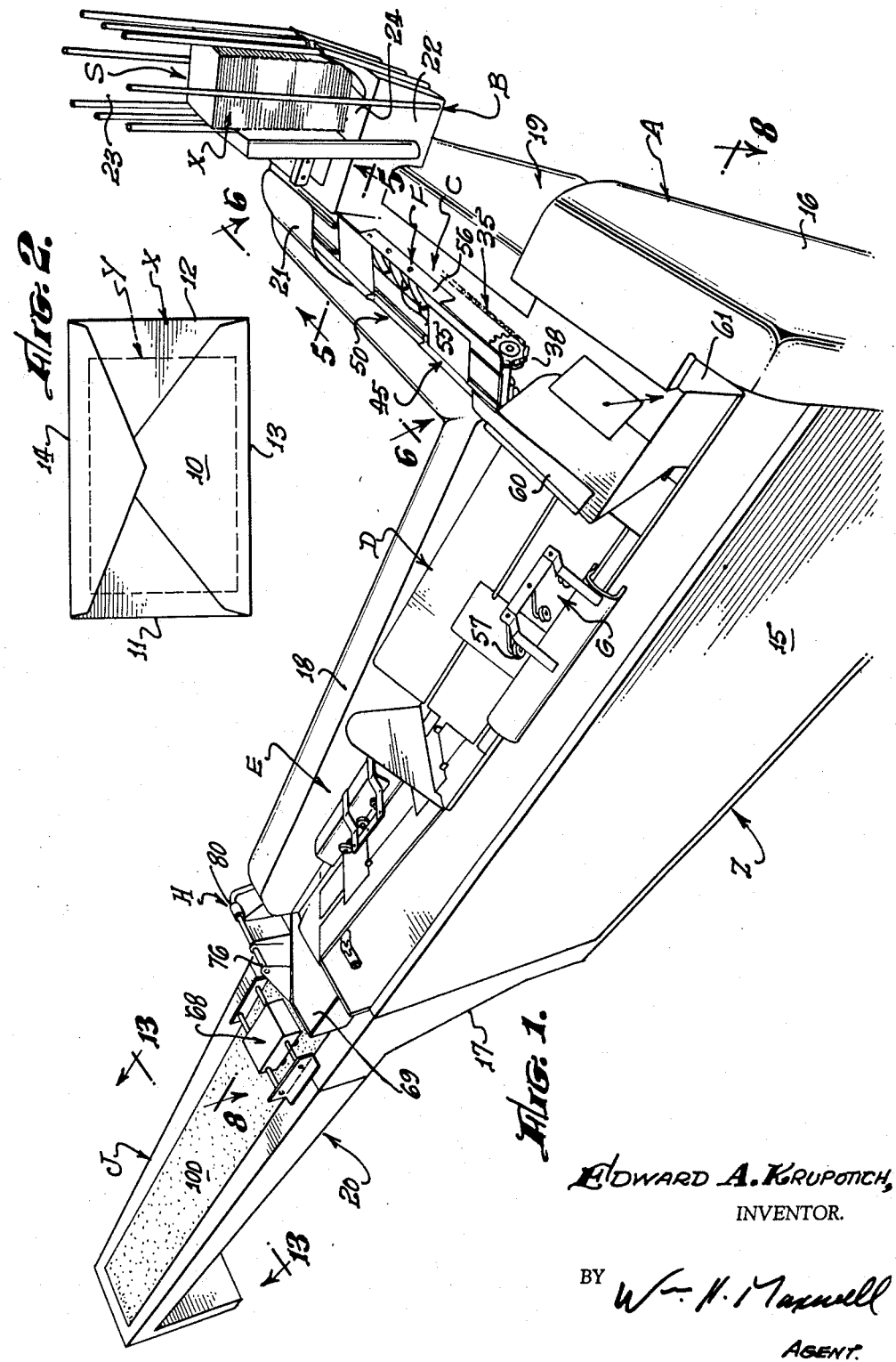
EDWARD A. KRUPOTICH,
INVENTOR.
BY W. H. Maxwell
AGENT.

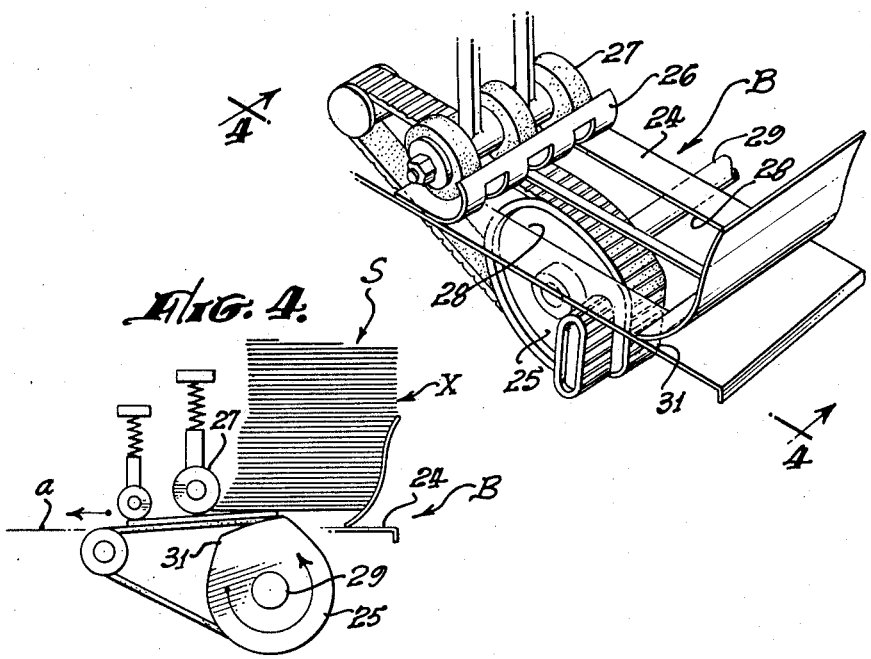
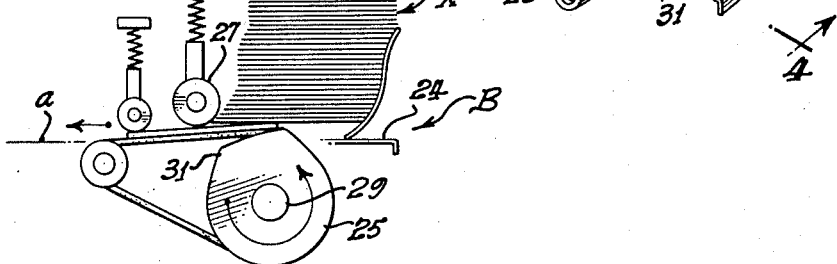
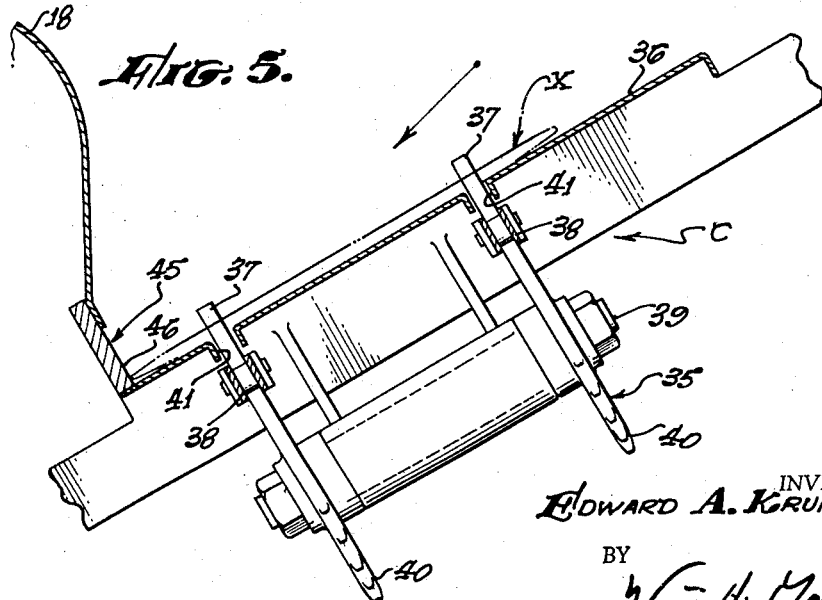

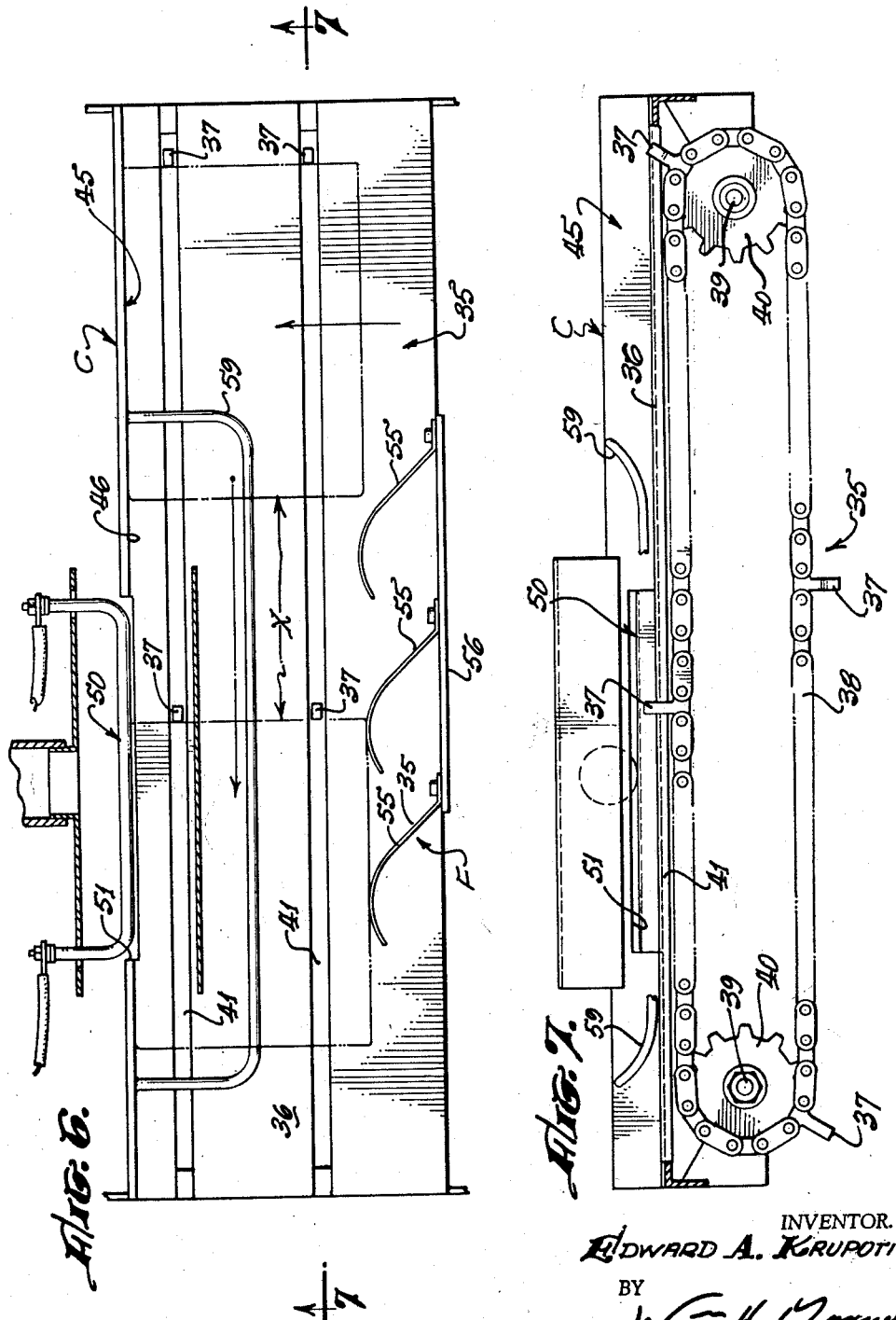

May 12, 1964 E. A. KRUPOTICH 3,132,629
ENVELOPE OPENING AND DISTRIBUTING APPARATUS
Filed June 27, 1960 6 Sheets-Sheet 4
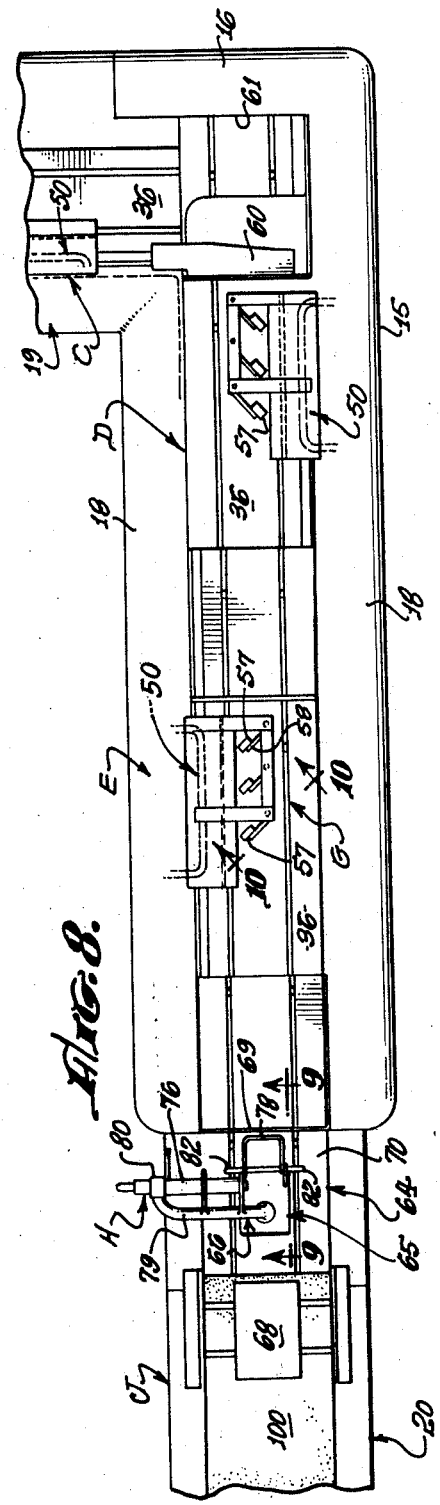
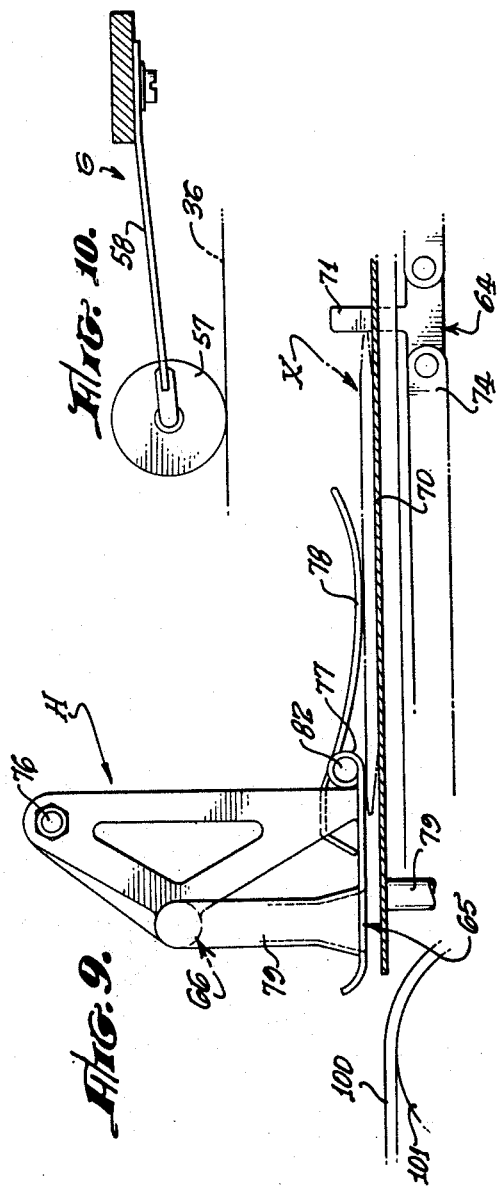
INVENTOR.
EDWARD A. KRUPOTICH,
BY
W. H. Maxwell
AGENT.

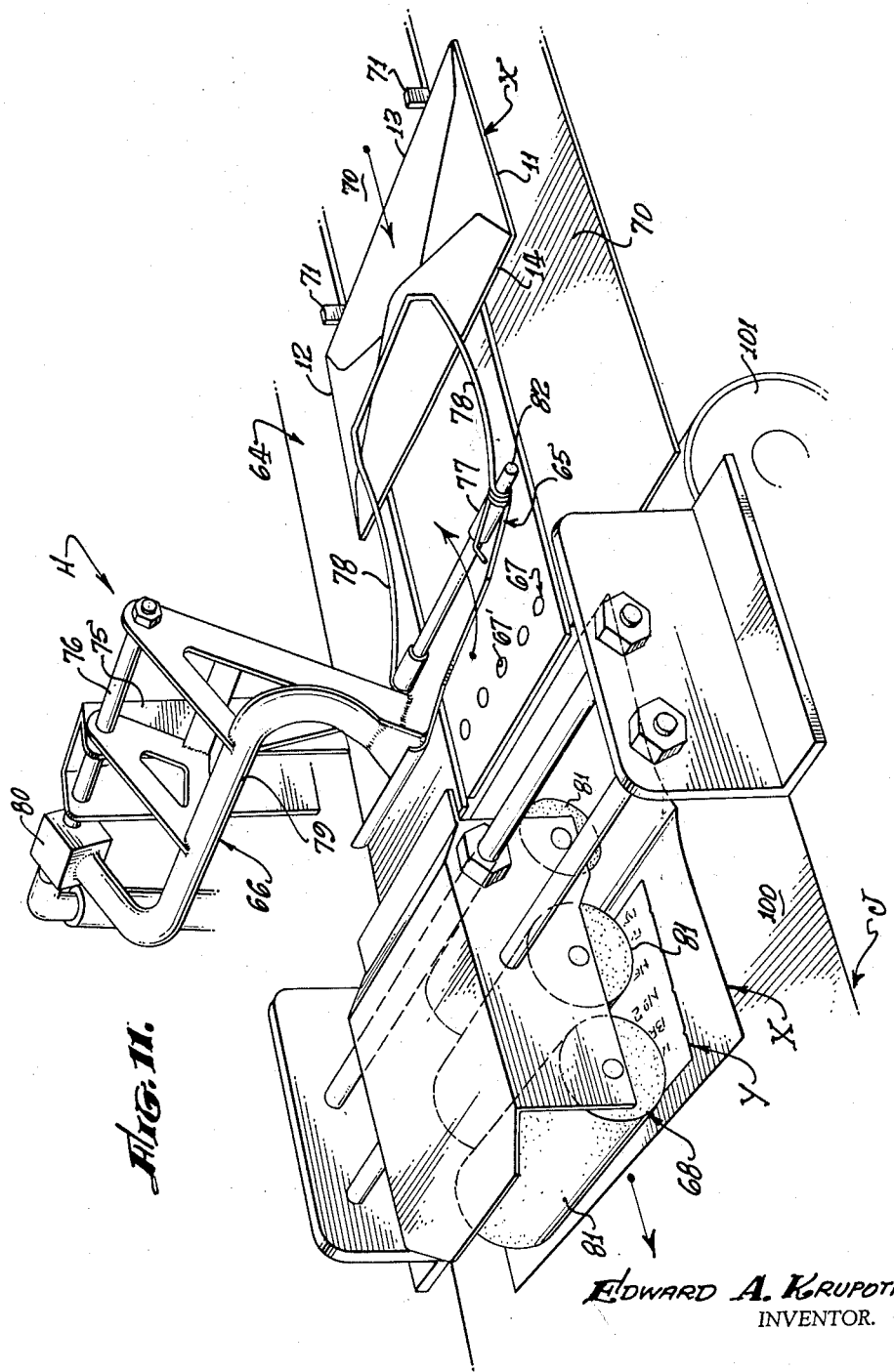

May 12, 1964  E. A. KRUPOTICH  3,132,629
ENVELOPE OPENING AND DISTRIBUTING APPARATUS
Filed June 27, 1960  6 Sheets-Sheet 6
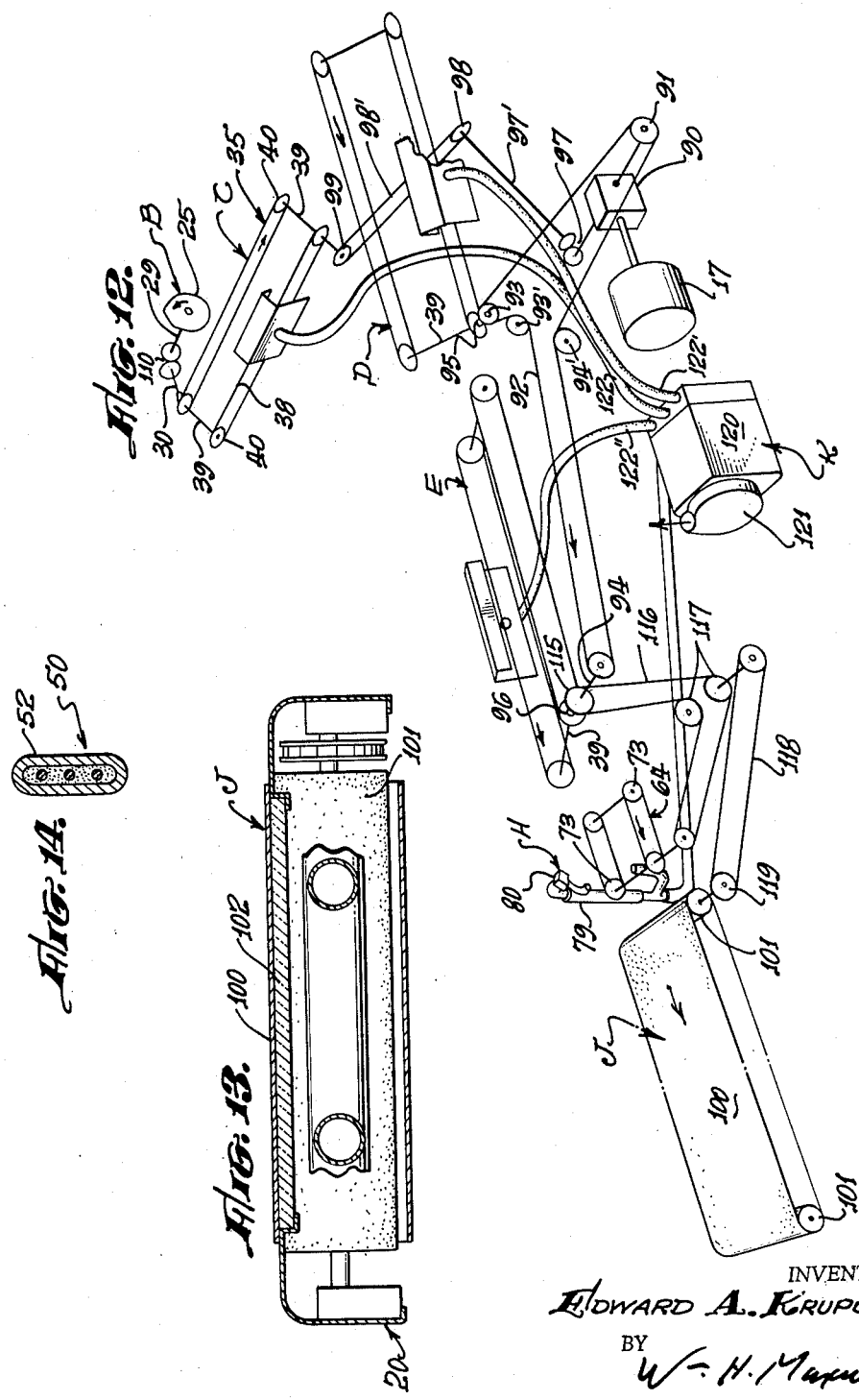
INVENTOR.
Edward A. Krupotich,
BY
W. H. Maxwell
AGENT

United States Patent Office 3,132,629
Patented May 12, 1964

3,132,629
ENVELOPE OPENING AND DISTRIBUTING
APPARATUS
Edward A. Krupotich, Los Angeles, Calif., assignor to
Thomas W. Evans, Howard J. Sherman, Wilbur Clark,
and Edward A. Krupotich, doing business as partners,
Beverly Hills, Calif.
Filed June 27, 1960, Ser. No. 38,854
9 Claims. (Cl. 120—35)

This invention deals with the opening of envelopes and with the extraction of the contents therefrom and it is particularly concerned with the handling and processing of large volumes of incoming envelopes delivered through the mail services and which require opening in order to expose and extract the contents thereof, this invention being the result of further development and improvement over the invention disclosed in application of Krupotich et al., Serial No. 834,015, filed August 17, 1959, and entitled Envelope Opener and Distribution Apparatus, now Patent No. 3,116,718, issued Jan. 7, 1964.

It is a general object of this invention to provide improved apparatus that automatically feeds and opens a continuous supply of envelopes, one by one, and at a controllable frequency, and which distributes said envelopes onto a moving conveyer in an open condition with the contents thereof exposed and accessible for manual extracting and removal thereof.

Envelopes are such as to require opening along one or more of the sides thereof, said envelopes being rectangularly-shaped closures in the form of flattened bags, usually of paper, and having pairs of straight and parallel sides. More specifically, an envelope is a prepared wrapper for a letter or paper, for example, a remittance, and so made that it can be sealed, the seal being by a gummed flap folded over to overlie one face of the envelope or wrapper. In any case, manual labor has been universally employed to open envelopes, by cutting open one or more sides of the envelope with a suitable instrument, for example, with a slitter or mechanical cutter, after which operation the contents are extracted by reaching into the envelope with the fingers or by tearing the envelope apart and removing the contents. Thus, it is apparent that several manual operations are usually necessary in the processing of envelopes to open them and to extract the contents therefrom.

Envelopes, as referred to above, are used commercially to secure remittances for services, products, premiums and for replies and sales in general. In many businesses a very large volume of mailed envelopes must be handled and processed, these envelopes being return addressed envelopes of uniform size in order to avoid error in mailing and to facilitate manual processes of opening said mail. Therefore, it is common practice for a business to receive large volumes of envelopes which require opening and which ordinarily require a substantial crew of personnel whose work involves manual opening of said envelopes and the distribution of stubs and payment checks received together in a single envelope.

An object of this invention is to consecutively handle envelopes, one envelope at a time, to destroy the edges of said envelopes, and to unfold them and thereby expose the contents thereof to be accessible for manual extraction and removal and distribution. The apparatus is powered and automatically processes the envelopes one by one in consecutive order and delivers said processed envelopes and contents upon a conveyer for manual interception by personnel, or the like.

An object of this invention is to provide an apparatus for handling and opening envelopes and wherein the envelopes are acted upon by gravity to be positioned for processing and to be transferred from one processing means to the next, and in which case certain of the processing means are both longitudinally and transversely inclined in order to gain full effect of gravitational action.

It is an object of this invention to provide improved means adapted to destroy and thereby separate the material of envelopes of varying sizes, and in random order, along the edges thereof, at least at three sides and/or ends thereof, and which thereby severs any connection therebetween and to the end that the envelope parts are free to be unfolded in order to expose the contents thereof.

It is another object of this invention convey and consecutively move envelopes along the above mentioned processing means, and along inclined planes, each of said processing means discharging into the next succeeding processing means. In order to carry out this objective, the processing means are related to discharge one into the next by means of gravity acting upon the envelopes as they are transferred from one processing means to the other.

Still another object of this invention is to unfold envelopes having three destroyed edges, so as to expose the contents thereof, an improved means being provided to lift and lay back one side of the envelope relative to the other side. The unfolding means that is provided involves a moving conveyer and a lifting means that coacts with movement of the conveyer to lay back one side of the envelope thereby exposing its contents.

Another object of this invention is to provide a single drive means adapted to power the plurality of processing means of the present invention.

It is also an object of this invention to provide an airconditioning means in connection with the processes involved in treating the envelopes. In accordance with the invention heat is employed in destroying the envelope edges, in which case smoke is generated. The said smoke is withdrawn from the separate processing means and removed and/or precipitated in an air cleaner so that the operation of the apparatus is clean and substantially odorless.

It is still another object of this invention to provide a compact and reliable apparatus embodying the features above referred to and which is operable throughout a wide and variable speed range to process envelopes of varying size and in random order and all without adjustment for variations in size and to distribute them for manual extraction of the contents thereof.

The various objects and features of this invention will be fully understood from the following detailed description of the typical and preferred form and application thereof, throughout which description reference is made to the accompanying drawings, in which:

FIG. 1 is a perspective view of a typical embodiment of the apparatus of the present invention and shows a stack of envelopes as they are received to enter the apparatus to be processed thereby and shows the conveyer onto which the opened envelopes are delivered with the contents thereof exposed for manual selection. FIG. 2 is a view of a typical envelope to be processed and handled by the apparatus herein disclosed. FIG. 3 is a perspective view of a portion of the supply mechanism of the apparatus, said mechanism being positioned at the far right of FIG. 1. FIG. 4 is a side view taken as indicated by line 4—4 on FIG. 3. FIG. 5 is a sectional view of a typical conveyer that is employed and is taken as indicated by line 5—5 on FIG. 1. FIG. 6 is a plan view of the conveyer and taken as indicated by line 6—6 on FIG. 1. FIG. 7 is a side sectional view of the conveyor and taken as indicated by line 7—7 on FIG. 6. FIG. 8 is a general plan view of the major portion of the machine or apparatus and is taken as indicated by line 8—8 on FIG. 1. FIG. 9 is an enlarged detailed view of the unfolding means that is provided and is taken as indicated by line 9—9 on FIG. 8. FIG. 10 is an enlarged view of a portion of the machine, being a view of the envelope guiding means as taken by line 10—10 on FIG. 8. FIG. 11 is a perspective view of the apparatus involving the unfolding means, said means being positioned at the left of FIG. 1. FIG. 12 is a perspective diagram of the drive and air conditioning means that operate and condition the machine or apparatus, respectively. And, FIG. 13 is a sectional view of the delivery conveyer and taken as indicated by line 13—13 on FIG. 1, and FIG. 14 is a sectional view of the heat applying means that characterizes the invention.

The apparatus herein disclosed is particularly useful in handling and processing envelopes to open and unfold them for the purpose of exposing the contents delivered therein. As clearly illustrated in FIG. 1 of the drawings, envelopes X are fed into the apparatus Z at one position and are delivered at another position in an opened and unfolded condition with the contents Y thereof exposed. The apparatus Z is a unit of construction with interrelated processing means each adapted to perform an operation upon the envelopes that continuously and consecutively pass through the apparatus. The apparatus Z is adapted to handle a stack S of envelopes X which are individually dispensed through the apparatus for opening, for unfolding, and for delivery at spaced intervals onto and along a conveyer and in an opened condition. The handling processes carried out by the apparatus are individually performed by separate processing means operating in timed relationship and driven by a variable speed drive means so that the frequency and rapidity of delivery can be governed to suit the subsequent handling of the opened envelopes and contents, namely the manual processing of the contents that are exposed.

In FIG. 2 of the drawings a typical envelope X is shown and which is in the nature of a flattened bag, or wrapper, made of folded sheet material, for example, of paper or the like. The back face 10 of the envelope is shown with the usual folds at three edges, 11, 12 and 13, and so that there are three portions of the sheet material that have overlapped engagement with adhesive securement therebetween, and forming said back face 10. The envelope is closed by means of a flap that extends from the fourth edge 14 to fold down and to overlie the above mentioned folds, said flap having a gummed marginal portion for adhesion to the back face 10 for sealing. It will be apparent that the envelope X is adapted to contain the contents Y in the form of one or more pieces of paper, or the like.

The apparatus Z is a powered device that functions to handle and process envelopes as above recited, and it involves, generally, a housing A, a supply means B, and a plurality of separate processing means, namely separate individual edge-destroying means, preferably three such means, C, D and E, an unfolding means H, and a delivery conveyer J. The housing A provides for support and enclosure of the mechanisms involved, while the supply means B and delivery conveyer J are accessible at two separated positions or opposite ends of the said housing. The said processing means C, D and E include conveyers that operate to move the envelopes X through the apparatus Z for processing to open the edges thereof and to unfold the envelopes.

The housing A can vary widely as circumstances require and is preferably an elongate upright cabinet with side walls 15, a front end 16 and a rear end 17. The cabinet is adapted for support on a flat surface or floor and it has a flat horizontally disposed top 18 open for access to the mechanisms therein. In practice, the top 18 is closed by transparent covers for viewing operation of the processing means C, D and E. The particular apparatus herein disclosed requires a lateral extension 19 projecting normally to one side 15 of the housing, and requires a longitudinal extension 20 at the end 17, said longitudinal extension projecting from the end 17 adjacent the top of the housing. As shown in FIG. 1, the edge destroying means C is accomplished in the lateral extension 19 of the housing, while the delivery conveyer J is accommodated in the longitudinal extension 20. The supply means B is a self-contained dispensing means accommodated in a housing 22 overlying the housing extension 19 and it operates to dispense envelopes X into and through the apparatus by depositing them onto the processing means C through the open top 18. There is a deflecting shield 21 to overlie the envelopes delivered by means B.

The supply means B is an envelope dispenser that is adapted to receive a stack S of envelopes X and to deliver them continuously one at a time and in a lateral direction and in a horizontal plane. Therefore, the delivery plane of the means B is positioned at about the plane of the top 18 of the housing A to dispense envelopes into the housing extension 19 and for processing by the subsequent processing means. The supply means B is powered through a take-off from the means C, as later described, and involves a feed chute 23, an envelope support 24, a drive wheel 25, a guide 26, and a stop 27. The feed chute 23 is shown as a gravity feed chute and is substantially vertically disposed and has guide rods spaced to engage with the edges 11 through 14 of the envelopes X to form them into the stack S. It will be apparent that different chutes 23 can be employed for different sized envelopes, or the said chute 23 can be adjustable if so desired. The envelope support 24 closes the lower end of the chute 23, the upper end thereof being open for the reception of additional envelopes as the apparatus operates continuously.

The said support 24 is positioned in a horizontal dispensing plane $a$ (see FIG. 4) and is a flat plate element that positions the lowermost envelope X. The said support has an aperture 28 therein provided to pass the peripheral portions of the drive wheel 25. As shown in FIGS. 3 and 4, the drive wheel 25 has a pulley portion operated by a shaft 29 driven by a power take-off shaft 30, and it has projecting peripheral portion or portions 31 of limited circumferential extent that extend through the aperture or apertures 28 to engage the underside of the lowermost envelope X. The portion or portions 31 are faced with frictional material, or pads, that grip the envelopes X to move them laterally in a forward direction, as indicated by the arrow in FIG. 4, to be dispensed from the means B. The guide 26 engages the forward edge of the lowermost envelopes X and has a lip spaced from the support 24 the thickness of one or two envelopes. In order to assure issuance of a single envelope at a time, the stop 27 is provided that involves lugs faced with frictional material and spaced above the support 24 to engage and stop only the envelope second from the bottom. It will be apparent that the shaft 30 can be operated at a speed to obtain the desired frequency of envelopes delivered over the edge of the support 24 at the plane $a$ and over the open top 18 and so that envelopes X are dropped one by one to fall through the said open top.

The edge destroying means are provided to destroy one or more edges 11 through 14 of the envelope X, and in carrying out the invention there is a separate means to process each edge to be destroyed. In order to unfold, that is, to completely unfold the material forming the envelope X, it is necessary to cut and destroy at least three edges of the envelope, for example, the two end edges 11 and 12 and at least one side edge 13 or 14. Therefore, one of said edges is normally related to the other two parallel edges, thus requiring destroying of one edge extending in one direction and of the two other edges extending in a direction normal to the first mentioned edge. With the apparatus herein disclosed, the envelopes are rectilinearly moved by the processing means C, D, and E, to be acted upon consecutively thereby, in which case the edge destroying means C is provided to destroy the edge 14 (or 13) while a pair of edge destroying means D and E are provided to destroy the opposite parallel edges 11 and 12.

The edge destroying means are alike and for all intents and purposes can be considered to be identical, the only exception being that they are made right- and left-handed as circumstances require. Therefore, a description of one of said means suffices for all, the cooperative relationship of the several, or plurality, of said means being hereinafter described. As best illustrated in FIG. 7, the means C, or the means D or E as the case may be, involves generally, a conveyer 35, a guide 45, and a heater or thermo guide rail 50. Generally speaking, envelopes X are deposited one at a time upon the receiving end of the conveyer 35 and engaged with the guide 45 to be moved past the thermo guide rail 50. In accordance with the invention, it is preferred that the conveyer 35 to be inclined transversely in order that the envelope X will slide by gravity into engagement with the guide 45 which extends along one side of the conveyer, said guide being aligned with the thermo guide rail 50 so that the one edge of the envelope is processed thereby as the envelope is conveyed forwardly.

The conveyer 35, of the means C, D or E, can vary in form and detail of construction. In its preferred form the conveyer 35 involves a slide plate 36 and a longitudinally shiftable advancing lug 37. The plate 36 is a flat element adapted to have flat supporting engagement with a side of the envelope X and the lug 37 projects upwardly from the top plane of the plate, either through the plate or alongside thereof, to engage and advance the envelope. Broadly, the lug 37 is moved rectilinearly to engage behind the envelope and to move the envelope forwardly, and with suitable mechanism there need be but a single lug. However, it is preferred that there be a multiplicity of lugs 37 carried on a continuous belt or chain 38, and spaced apart along the chain so that each lug 37 engages an envelope X dropped by the means B. More specifically, it is preferred that the lugs 37 be provided in pairs to have spaced engagement with the rear edge of the envelope. Therefore, the conveyer 35 in its preferred form, has spaced shafts 39, one at each end of the slide plate 36, each shaft carrying laterally spaced sprockets 40. A pair of parallel chains 38 operate over the sprockets 40 and the pairs of lugs 37 are oppositely positioned on the chains, respectively, to occur on a common normal line extending transversely of the conveyer. In practice, the conveyer plate 36 is provided with longitudinal slots 41 through which the lugs project above the plane of said plate.

The guide 45, of the means C, D or E, can vary somewhat in actual design. That is, it can be moving or fixed, for example as part of a conveyer belt so that it moves, or as preferred it is a separate fixed element. As shown in FIGS. 5 and 6 the guide 45 is a slide rail that extends longitudinally of the conveyor 35 and parallel with the motion of the lugs 37. The guide or slide rail 45, like the plate 36, is a smooth element and it is straight having a face 46 that extends in a plane normal to the plane of the slide plate 36. Thus, the envelope X deposited upon the transversely inclined conveyor 35 drops into engagement with both the plate 36 and face 46, to be advanced forwardly thereby by movement of the lug or lugs 37.

The heater or thermo guide rail 50 is the envelope processing element per se and, as above pointed out, it is aligned with the guide 45. In practice, the guide 45 is interrupted by an opening 51 provided therein and the rail or heater element 50 occupies the opening 51 to form a continuation of the face 46 of the guide. In accordance with the invention, the thermo guide rail 50 is provided to destroy the edge of the envelope, whichever edge thereof comes into contact with or close proximity to the heater. Since envelopes are made of paper, or the like, substantially uniform thickness and character the heater 50 has been provided to destroy the folded edge 11, 12, 13 or 14 by carbonization. That is, sufficient heat is applied at or in the proximity of the folded edge to destroy the paper body forming the same, and this will be referred to as a carbonizing process. By the application of sufficient heat, without the presence of fire, it has been found to be possible to reduce the folded edge of the paper into carbon particles that are so brittle and so weak as to fail mechanically with the slightest application of force or pressure. In other words, the envelope edges are substantially weakened by means of applying heat.

In carrying out the present invention, it is preferred that the heater or thermo guide rail 50 be in the form of an elongate rod energized electrically to produce the necessary heat at the surface thereof. As shown, the said rod is flattened in cross section and encased in a smooth metallic sleeve or shell 52. The necessary insulation and electrical resistance element is housed in the shell 52 and connected to suitable electrical power lines. Further, thermostatic controls (not shown) can be provided to maintain the desired heat range, it being the preferred and present practice to provide a heat of 550° F. to 1350° F. at the surface of the heater 50.

From the foregoing it will be apparent that the conveyer 35 moves the envelopes X one by one past the heater or thermo guide rail 50. The said heater is elongate and forms a continuation of the guide 45 and over which the edge of the envelope must slide or ride. It is to be observed that the envelope X is first dropped into place at the rear portion of the conveyer 35 where the lowermost edge thereof comes into coextensive resting engagement with the face 46. Thereupon, assuming that the machine is in operation, the next advancing lug, or lugs, 37 engages the rearmost edge of the envelope X to advance it toward or over the opening 51 occupied by the heater or thermoguide rail 50. The rate or speed of advancement is determinable and is controlled, it being present practice to advance the envelopes at a rate or speed of at least one foot per second. After the envelopes have been acted upon by the rail 50 they continue forwardly onto the forward portion of the conveyer 35 after which they are discharged off of the forward terminal end of the slide plate 36 at a rate of between 1000 and 6000 per hour, depending upon the number of personnel attending the machine.

In carrying out this invention means F and/or G are provided to assure constant and coextensive and continued engagement of the envelope edge 11, 12, 13 or 14 with the guide face 46 and thermo guide rail 50. In FIG. 6 of the drawings the means F is illustrated and which involves one or more fingers 55 spaced from and biased toward the guide face 46. There is preferably a series of fingers 55 supported by a common bar 56, each being a spring element positioned to be engaged by the edge of the envelope opposite the edge thereof engaged with the guide face 46. The spring fingers 55 are deflected by engagement with the envelope and yieldingly press the envelope edge into coextensive engagement with the guide face 46. In FIGS. 8 and 10 of the drawings the means G is illustrated and which involves one or more wheels 57 engageable with the side of the envelope X faced upwardly from the slide plate 36. The wheel or wheels 57 are held in a fixed position by means of a mounting bar 58 and are urged into engagement with the envelope to roll freely thereon. As shown, the wheels are turned so as to track on the surface of the envelope in order to urge the envelope toward the guide face 46. Thus, the envelope X is assured of having continuous coextensive engagement with the guide face 46 and also with the heater, even without the aid of gravity. In addition to the guiding means F and G, a depressor 59 is provided to assure flat engagement of the envelope with the plate 36. The depressor 59 is in the form of a rail of spring wire that overlies the plate 36, as shown (see FIGS. 6 and 7).

The edge destroying means C, D and E, hereinabove described, are cooperatively related and operated in timed relationship so as to effectively destroy three edges of the envelope X, for example, the edges 11, 12 and 14. As pointed out above, the edge destroying means D is housed in the extension 19 of the housing A, and the edge destroying means D and E are arranged in series relationship following the means C and are housed in the main portion of the housing A. In each case the said means are positioned adjacent the open top 18 of the housing, the means C being normally related to the other two means D and E that are in longitudinal alignment. As a result, the motion of conveying in the latter two means D and E is at right angles to the motion of conveying in the first mentioned means C.

As hereinabove described, the envelopes X are dropped by the means B, one by one, and onto the conveyor 35 of the edge destroying means C, said means being horizontally disposed with its terminal discharge end at or overlying the rearmost receiving end portion of the conveyor 35 of the edge destroying means D. Assuming that the envelope edge 14 is dropped into engagement with the guide 45 of means C, said edge will be destroyed and the edge 11 will then drop toward the guide 45 of means D. In accordance with the invention, the rearmost receiving end of the edge destroying means D is positioned well below the level of the discharge level of means C, thereby permitting the envelope to gain substantial momentum whereby it will carry itself by inertia into a position where it is stopped by said guide 45 of means D. Since the means C is transversely inclined, a deflector 60 is provided to turn down the undestroyed edge 13 of the envelope, as it discharges from the end of the means C, and thus the envelope descends toward the rearmost end of the means D where it is guided to a resting position on the slide plate 36 of said means by a vertical guide wall 61.

In accordance with the invention, the edge destroying means D is longitudinally inclined so that the forward discharge end is at about the height of level of the first mentioned means C. Assuming that the envelope edge 11 is dropped into engagement with the guide 45 of means D, said edge will be destroyed and the opposite edge 12 will be left remaining. Like the means D, the edge destroying means E is longitudinally inclined so that the forward discharge end is at about the height or level of the first mentioned means C, the lowermost receiving end of the means E being at or positioned well below the discharge level of the means D. Again, the envelope drops and its inertia carries it into engagement with the guide 45 of the edge destroying means E. In this latter instance, it is the edge 12 that engages the guide face 46, to the end that the three edges 11, 12 and 14 are each destroyed.

The unfolding means H is best illustrated in FIGS. 9 and 10 and is provided to lift and fold back the uppermost side of the envelope X, which side or face has been cut and severed from the opposite side or face by destruction of the said three edges 11, 12 and 13 or 14. The means H involves generally, a conveyor 64, a lifting plate 65, a means 66 to secure one face of the envelopes to the plate 65, a means 67 to secure the other face of the envelopes to the conveyor 64, and means 68 to draw envelopes from the plate 65. It is to be observed that the edge 14 (or 13) first destroyed by the means C is the forwardmost edge of the envelope as it travels through the processing means D and E. Therefore, the envelope with three destroyed edges has two parallel side edges and one leading edge, all three of which are destroyed so that opposite side faces of the envelope can be separated. However, the one edge 13 (or 14) remains intact and provides the unfolding line.

The envelopes are discharged from the edge destroying means E at the upper level of the machine, the said means being inclined as specified, and they are dropped one by one onto the conveyor 64 of the unfolding means H. Again, the envelopes drop and inertia carries them into engagement with a guide plate 69 that stops and positions them on the conveyer. The conveyer 64, like the conveyer 35, can vary in form and detail of construction and preferably involves a slide plate 70 and drive lugs 71. The plate 70 is disposed in a substantially horizontal plane. The drive lug 71 projects upwardly from the top plane of the plate 70 and carried by a drive chain 74 that operates over drive sprockets 73 (see FIG. 12). Broadly, the lug 71 is moved rectilinearly to engage behind the envelopes and to move them forwardly. It is preferred that there be a multiplicity of lugs 71 carried on the chain, or chains, and in pairs at opposite sides of the plate 70. Thus, an envelope dropped onto the conveyer 64 is positively engaged and is driven forwardly by the upwardly projecting lugs 71.

The lifting plate 65 is the moving part or element that characterizes the unfolding means H. The plate 65 normally overlies the plate 70 in spaced parallel opposed relationship and with enough space therebetween to receive an envelope with its contents. In accordance with the invention, the lifting plate 65 is shiftable so as to turn upwardly as the conveyer advances the envelope forwardly. Although various motions can be restored to in effecting a turning action it is preferred that the lifting plate 65 be pivotally mounted and so that it swings through an arc. As shown, the plate 65 is carried by a bracket 75 that supports a shaft 76 that is horizontally disposed and spaced above and parallel with the plate 70 on a transverse axis. A stop limits downward swinging of the plate 65 to position it horizontally, the rearmost edge of the plate being beveled or rounded at 77 if so desired. In order to assure passage of the envelope beneath the plate 65 an arm 78 projects rearwardly from the plate and is articulated from the rear edge at 77. It is preferred that the arm 78 be turned and bent arcuately so as to flare upwardly from the plate 70 of the conveyer, when it is moved rearwardly as the plate 65 is swung down to its normal envelope receiving position.

The means 66 that is provided to secure one face of the envelopes to the lifting plate 65 is preferably a pneumatic means and it acts to fasten the uppermost side or face of the envelope to said lifting plate. As shown, the means 66 involves an opening in the plate 65 and a suction line 79 in communication with the opening. The suction line 79 is connected with a suitable source of negative pressure, for example a suction pump (such as the suction means 121 later described) and it is flexible so as to not interfere with swinging motion of the plate 65. In practice, the line 79 includes an anti-friction swivel connection 80 on the axis of the shaft 76. It will be apparent that the uppermost side or face of the envelope X is drawn into engagement with the underside of the plate 65 when it is advanced thereunder by the conveyer 64.

The means 67, like the means 66, is preferably a pneumatic means and it acts to fasten the lowermost side or face of the envelope to the plate 70 of the conveyor 64. A branch 79 of the suction line 79 extends to the underside of the plate 70, underlying the movable plate 65, where it communicates with an opening 67', preferably a transverse slot or series of openings. Thus, the lowermost side or face of the envelope X is drawn onto the plate 70.

The means 68 that is provided to draw envelopes from the lifting plate 65 is preferably a mechanical traction means and it acts to pull the uppermost side or face of the envelope X away from the plate 65 to which it has been attached by the means 66, just described. As will be apparent, the plate swings forwardly and upwardly as the envelope is advanced forwardly and upwardly as the envelope is advanced forwardly by the lugs 71 to move out from beneath the said plate. Therefore, the means 67 is positioned to follow the handling of the envelope by the lifting plate 65 and means 66. As shown, the traction means 68 is positioned at the delivery end of the conveyer 64 (or extension thereof) and is adapted to press the advancing envelope into pulling engagement with the conveyer J. The means 67 is in the nature of a presser and involves a belt or multiplicity of rollers 81 biased toward the conveyer and so that there is sufficient frictional engagement to draw the uppermost side of the envelope from the lifting plate 65. The rollers 81 are preferably soft compressible rollers and are rotatable on transverse axes and are suitably journaled in a housing overlying the conveyer.

In accordance with the invention, a positive swinging action of the plate 65 is gained by drive rods 82 that project laterally of the plate at 77. The rods 82 are intercepted by the lugs 71 and are thereby moved when the trailing edge of the envelope reaches the said edge at 77 of the plate 65. In this way, the engagement of the plate 65 is substantially coextensive with the uppermost side or face of the envelope X and with the trailing edge at 77 coincidental with the remaining fold of the envelope at 13 (or 14). It will be apparent that the rods 82 will trip over the driving lugs 71 to engage with the next advancing lugs 71. When the envelope is pulled from the plate 65, the said plate drops by gravity and swings downwardly and rearwardly to a normal envelope receiving position.

The above described machine or apparatus delivers cut and opened envelopes at the rear end 17 of the housing A in a horizontal plane spaced somewhat below the top thereof and moving or advancing. The delivery conveyer J is provided to receive the cut and opened, or unfolded envelopes X, and as best illustrated in FIGS. 12 and 13 of the drawings, is a belt type conveyer involving a continuous flexible belt 100 extending between rollers 101. The conveyer J forms an extension of the conveyer 64 and is of substantial length, the cut and opened envelopes X being distributed therealong with the contents Y thereof exposed. The belt 100 is slidably supported on a table 102, the envelopes being supported thereon for manual extraction of the contents thereof. In accordance with the preferred form of the invention, the table is a light box that faces upwardly, and it has suitable lighting therein and a transparent top. Further, the belt 100 is translucent, all to the end that light is shown through the opened envelope in order to make the contents more conspicuous.

From the foregoing, the handling and processing of the envelopes should be clear and each of the above described means functions to perform or facilitate the processes involved, the machine or apparatus is activated by a single prime mover or motor M that operates a gear reducer 90. The said gear reducer can be of any suitable type and is adapted to gain the desired speed of operation, the output shaft thereof being disposed on an axis extending transversely of the housing A within the lower region thereof. A drive sprocket 91 is carried at one end of the output shaft and is adapted to operate the means D, E, H and J. A drive chain 92 extends over and from the sprocket 91 toward the end 16 of the housing and rotates a driving shaft 93 for the means D and a driving shaft 94 for the means E. The two shafts 93 and 94 are within the upper region of the housing A, the shaft 93 being to one side of the foremost or pulling shaft 39 of the means D, and the shaft 94 being to one side of the foremost or pulling shaft 39 of the means E. Suitable driving sprockets are carried on the shafts 93 and 94 respectively, and idlers 93' and 94' are provided to tension the chain 92. Since the edge destroying means D and E are oppositely inclined transversely of the housing A, there are angle drives for rotatably driving the shafts 39 thereof. In practice the shafts 93 and 94 are horizontally disposed and universal joints 95 and 96 are provided to couple with the said shafts respectively. Thus, the edge destroying means D and E are operated from the motor M.

In order to drive the edge destroying means C, and the supply means B, a pair of bevel gears 97 is carried and driven off of the end of the output shaft opposite the sprocket 91. The bevel gears rotate a shaft 97' extending normal to the output shaft and inclined so as to be parallel with the inclined axes of shafts 39 of the means C, and in this case there is a driving sprocket 98 on the shaft 97', operating a driven sprocket 99 on the foremost shaft 39 of the means C, and driving through a chain 98'. Since the supply means B is located to precede the means C, it is geared to the said means C, preferably through bevel gears 110 that operate the drive shaft 29 of means B. Thus, the edge destroying means C and supply means B are operated from the motor M.

In order to drive the unfolding means H and the delivery conveyer J, the above mentioned shaft 94 carries a drive sprocket 115 that is adapted to operate said means. A drive chain 116 extends over and from the sprocket 115 toward the means H and rotates the foremost shaft and sprocket 73 of the conveyer 64. The chain 116 extends over suitable idlers 117, one of said idlers operating a counter shaft that is provided to drive the conveyer J. Since the conveyer J is in the nature of an extension, a separate drive chain 118 is provided to operate the same and extends from out of the housing A to and over a driving sprocket 119 on the rearmost roller shaft of the conveyer J. Thus, the unfolding means H and delivery conveyer J are operated from the motor M.

From the foregoing, wherein the operation of each individual means is fully described, it will be apparent how the machine or apparatus of the present invention operates to substantially weaken and destroy the edges of and to unfold envelopes. In addition to said means that cooperatively engage and process the said envelopes to open the same, an air-conditioning means K is provided and which operates to draw off and clean the products of disintegration resulting from destroying the edges of the envelopes, in theory by carbonization. The means K involves an air cleaner 120, an air suction means 121, and a plurality of suction tubes 122, 122' and 122". As clearly shown, the tubes 122, 122' and 122" extend to the means C, D and E, respectively, where they open at the heaters or thermo guide rails 50 and operate to draw off the products of disintegration. The said tubes merge into the entry chamber of the cleaner 120, which can be any suitable air cleaner, for example a pack of activated charcoal or an electrostatic filter that processes the air passing therethrough and which attracts particles therefrom to deposit them upon collecting elements. The air suction means 121 can be any suitable air pump adapted to move a column of air through the cleaner 121 and suction tubes 122, 122' and 122". Thus, the discharge of impurities into the air as a result of application of heat is compensated for by removal of said impurities within the apparatus.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. Apparatus of the character described and adapted to destroy the edge of an envelope, and including, a conveyer to support and move the envelope, a heated guide rail adjacent one side of the conveyer and aligned to carbonize an edge of the envelope engaged therewith as it is advanced by the conveyer, and means engaging the envelope with the heated guide rail, whereby the envelope is weakened at said edge.

2. Apparatus of the character described and adapted to destroy the edge of an envelope, and including, an elongate transversely inclined conveyer to support and move the envelope, and a heated guide rail adjacent the lower side of the conveyer and aligned to carbonize an edge of the envelope engaged therewith by means of gravity as it is advanced by the conveyer, whereby the envelope is weakened at said edge.

3. Apparatus of the character described and adapted to destroy the edge of an envelope, and including, a conveyer having a slide plate for support of the envelope and with a forwardly shiftable drive lug to advance the envelope along the plate, a heated guide rail adjacent the conveyer to slidably engage and to carbonize an edge of the envelope as it is advanced by the drive lug, and means engaging the envelope with the heated guide rail, whereby the envelope is weakened at said edge.

4. Apparatus of the character described and adapted to destroy the edge of an envelope, and including, a conveyer having an elongate transversely inclined slide plate for support of the envelope and with a forwardly shiftable drive lug to slidably advance the envelope along the plate, and a heated guide rail adjacent the lower side of the conveyer and aligned to carbonize an edge of the envelope engaged therewith by means of gravity as it is slidably advanced by the drive lug, whereby the envelope is weakened at said edge.

5. Apparatus of the character described and adapted to destroy the edge of an envelope, and including, a conveyer to support and move the envelope, a guide to direct movement of the envelope into contact with a heated guide rail to carbonize the edge of the envelope, and air cleaning means having a suction tube opening at the said guide rail to receive the products of carbonizing and a filter in communication with the tube.

6. Apparatus of the character described and adapted to destroy the edges of an envelope, and including a series of consecutively arranged edge destroying means discharging envelopes one into the next and each comprising a conveyer to support and move the envelope, a heated guide rail adjacent the conveyer to carbonize an edge of the envelope engaged therewith as it is advanced by the conveyer, and means engaging the envelope with the heated guide rail, whereby the envelope is weakened at the edges so engaged.

7. Apparatus of the character described and adapted to destroy three edges of an envelope, and including, three consecutively arranged edge destroying means discharging envelopes one into the next and each comprising, a conveyer to support and move the envelope, a heated guide rail adjacent the conveyer to carbonize an edge of the envelope engaged therewith as it is advanced by the conveyer, and means engaging the envelope with the heated guide rail, whereby the envelope is weakened at the three edges so engaged.

8. Apparatus of the character described and adapted to destroy the edges of an envelope, and including, a series of consecutively arranged edge destroying means discharging envelopes one into the next and each comprising a conveyer to support and move the envelope, a heated guide rail adjacent the conveyer to carbonize an edge of the envelope engaged therewith as it is advanced by the conveyer, and means engaging the envelope with the heated guide rail, whereby the envelope is weakened at the edges so engaged, one of said means being longitudinally inclined with its receiving end portion below the plane of the discharge plane of the next preceding means.

9. Apparatus of the character described and adapted to destroy three edges of an envelope, and including, three consecutively arranged edge destroying means discharging envelopes one into the next, the first means being disposed normal to the next succeeding aligned means and each comprising, a transversely inclined conveyer to move the envelope, and a heated guide rail adjacent the lowermost side of the conveyer to carbonize an edge of the envelope as it is advanced by the conveyer, the first and third edge destroying means having oppositely transversely inclined conveyers, whereby the envelope is weakened at three edges.

References Cited in the file of this patent

UNITED STATES PATENTS

| Number | Name | Date |
|---|---|---|
| 771,852 | Wolf | Oct. 11, 1904 |
| 924,562 | Metzke | June 8, 1909 |
| 965,868 | Byrnes | Aug. 2, 1910 |
| 1,096,933 | McCrum | May 19, 1914 |
| 1,109,958 | Bryant | Sept. 8, 1914 |
| 1,143,919 | Scott | June 22, 1915 |
| 2,420,642 | Almgren | May 20, 1947 |
| 2,471,310 | Charles | May 24, 1949 |
| 2,786,565 | Eckart | Mar. 26, 1957 |
| 2,957,065 | Bundegaard | Oct. 18, 1960 |
| 2,992,629 | Belopavlorich | July 18, 1961 |
| 2,997,833 | Nigrelli | Aug. 29, 1961 |